Nov. 11, 1924.
M. H. MERRIAM
1,514,777
AUTOMOBILE ATTACHMENT
Filed May 19, 1922
4 Sheets-Sheet 1
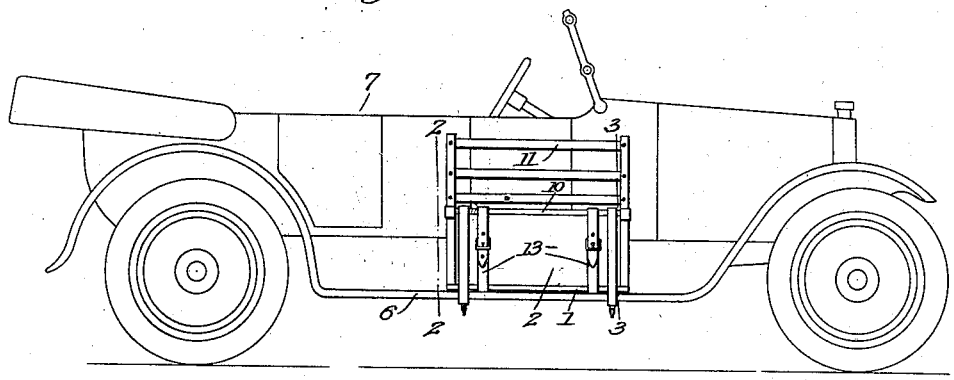
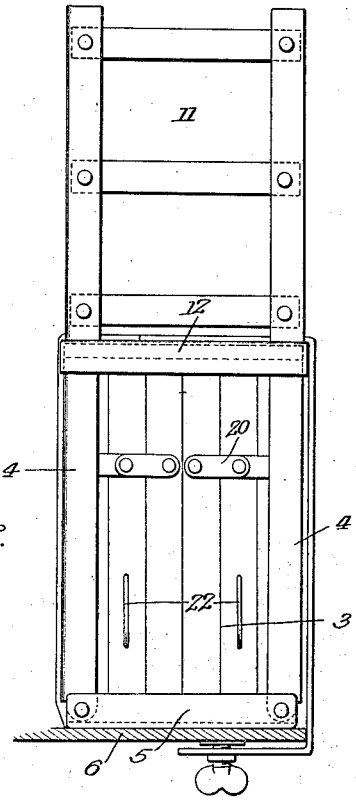
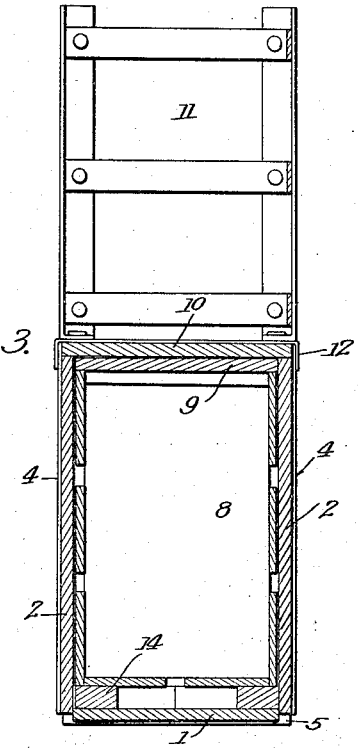
M. H. Merriam
INVENTOR
BY Victor J. Evans
ATTORNEY
WITNESS:

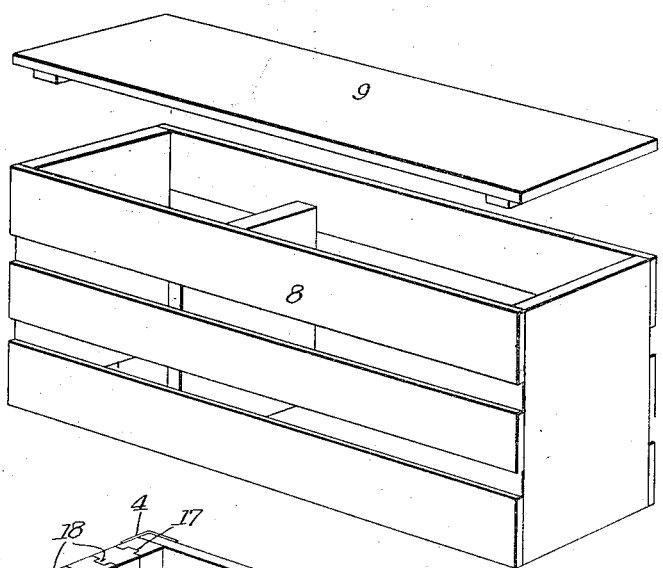
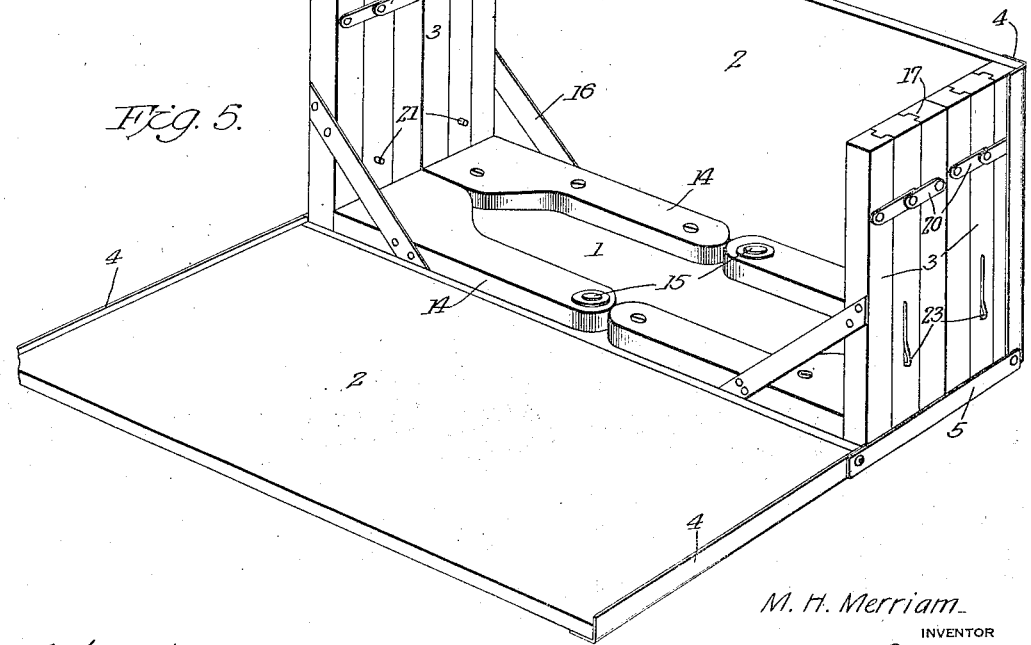

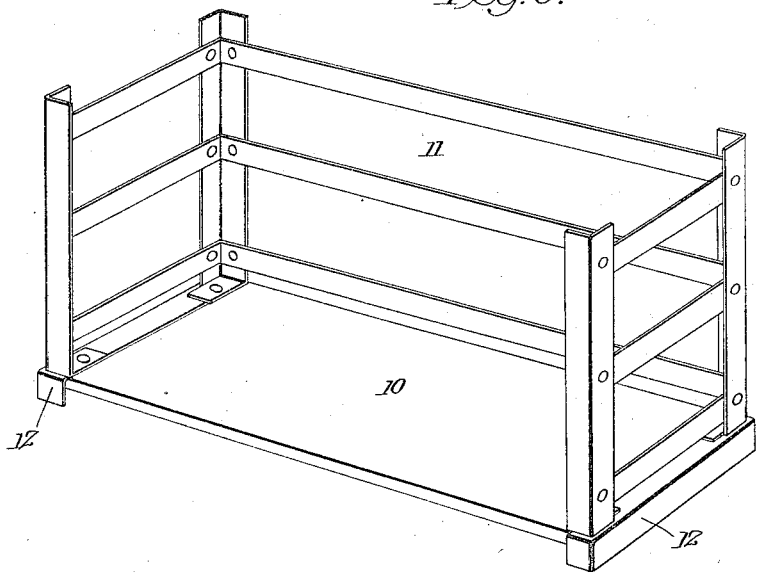

Nov. 11, 1924.

M. H. MERRIAM

AUTOMOBILE ATTACHMENT

Filed May 19, 1922

M. H. Merriam
INVENTOR

BY Victor J. Evans
ATTORNEY

Patented Nov. 11, 1924.

1,514,777

UNITED STATES PATENT OFFICE.

MELVEL H. MERRIAM, OF BUTTE, MONTANA.

AUTOMOBILE ATTACHMENT.

Application filed May 19, 1922. Serial No. 562,214.

*To all whom it may concern:*

Be it known that I, MELVEL H. MERRIAM, a citizen of the United States, residing at Butte, in the county of Silver Bow and State of Montana, have invented new and useful Improvements in Automobile Attachments, of which the following is a specification.

My present invention has reference to an attachment for automobiles and is in the nature of a luggage carrier and camping outfit.

My object is to produce a device which can be strapped or otherwise secured on the running board or other convenient part of an automobile and which includes a luggage carrier, a container for food stuff or other articles and a foldable and extensible table.

The foregoing objects and others which will present themselves as the nature of the invention is better understood, may be accomplished by a construction, combination and operative association of parts such as is disclosed by the drawings which accompany and which form part of this application.

In the drawings:—

Figure 1 is a view illustrating the improvement secured on the running board of an automobile.

Figure 2 is a sectional view on the line 2—2 of Figure 1.

Figure 3 is a sectional view on the line 3—3 of Figure 1.

Figure 4 is a perspective view of the outer frame or luggage carrier.

Figure 5 is a perspective view of the table member in its knock down and folded condition.

Figure 6 is a similar view of the inner food stuff receptacle.

Figure 9 is an enlarged fragmentary sectional view through one of the corners of the device when set up as a table to more clearly illustrate the manner in which the slidable leg sections are held in their outward position on the fixed leg sections.

Figure 7:
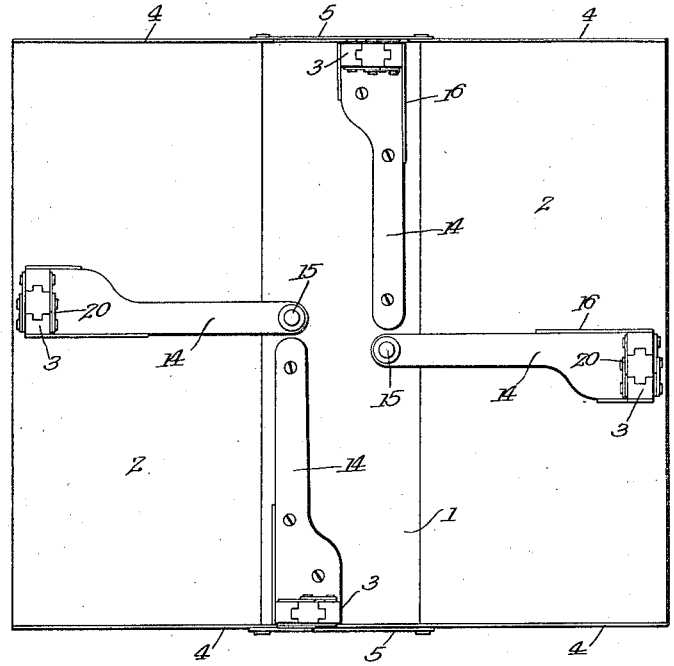
Figure 7 is a bottom plan view of the table.
Figure 8:
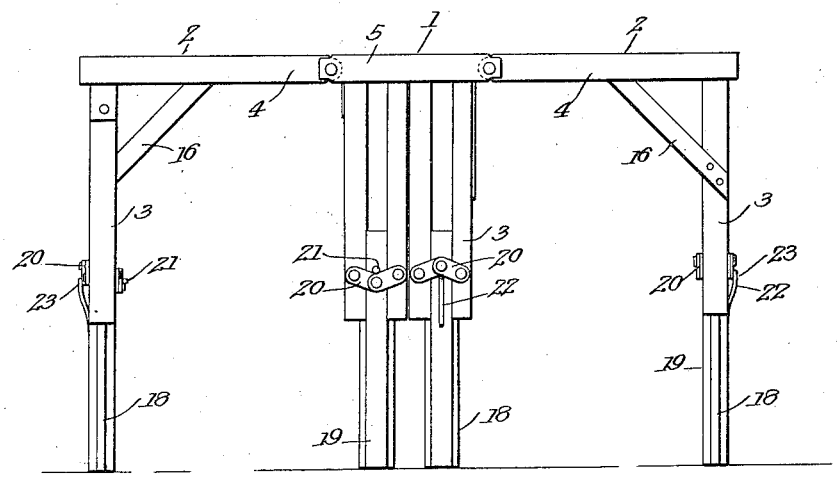
Figure 8 is an elevation of the table in its set-up condition.

The table portion of my improvement includes a top 1 that has hingedly secured to the edges thereof leaves 2 each of which being of a materially greater width than the top. At the ends of the top there are normally arranged the legs, broadly indicated by the numeral 3. The leaves 2 and the top 1 have downwardly directed flanges 4 and 5 respectively which frictionally contact the outer faces of the legs, and the pairs of legs at each end of the top when arranged in a position so that the table is converted into a substantially rectangular receptacle are of a width equalling that of the said top and provide the ends of the receptacle.

The table, in the showing of the drawings is arranged on the running board 6 of an automobile 7, the top resting directly on the running board so that the open portion of the folded table is directed upwardly.

Received in the folded table, and of a length to contact with the inner surfaces of the leaves and legs, there is a food receptacle 8. The receptacle may be divided into any number of compartments, and the open top of the receptacle is normally closed by a plate 9. The plate may be hingedly secured to the receptacle, but preferably the same is removably associated therewith, so that the said plate may be employed with the receptacle as a bench when the table is in set-up condition.

Resting on the plate 9 of the receptacle 8 is the base 10 of a luggage carrier 11. The luggage carrier, except for the base is preferably in the nature of an open substantially U-shaped frame, the same being provided at its ends and corners with depending flanges 12 that are arranged over the corners of the receptacle provided by the closed table. Suitable means, preferably in the nature of straps 13 secure the devices above described on the running board of the automobile. It is, of course, to be understood that the device may be attached to other parts of the machine should the same be found desirable.

The luggage carrier, of course, provides a means whereby suitable articles of clothing as well as table linens, etc., may be conveniently conveyed, while certain of the compartments in the receptacle 8 may be employed for the reception of dishes, cooking utensils, and other culinary articles, the remaining compartments being provided for the required food stuffs.

When the automobile has been driven to a place convenient for camping or picnicking, the device is unstrapped from the machine, the luggage carrier is separated from the receptacle and the food receptacle is arranged so that articles therefrom can be positioned on the table.

By reference to the drawings, it will be seen that the two legs which are normally arranged at each end of the table 2 are each provided, on their inner or top ends with right angularly arranged cleats 14, the cleats 14 on the two diagonally opposed legs being permanently secured to the top and the outer edges of all of the cleats are in a line with the longitudinal edges of the top, thus providing additional supports for the leaves 2 when the table is converted into a receptacle. The two remaining cleats have their ends pivoted, as at 15 to the top 1. Suitable braces 16 are provided between the cleats and the outer edges of the legs. The pivoted legs are, of course, susceptible to swinging transversely beneath the leaves 2, when the latter are swung flush with the top 1, and the table is in set-up condition.

As the table is required for use upon uneven ground surfaces, each of the legs 3 is of a collapsible or telescopic nature. Each leg, in fact, includes three sections, the outer sections being rigidly connected to the widened outer ends of the cleats 10 and the confronting edges of these sections are grooved, as at 17. The inner section has its edges provided with tongues 18 that are received in the grooves 17. Thus it will be noted that the inner sections indicated for distinction by the numeral 19 are slidably associated with the outer sections. Connecting the outer sections of each leg, upon both the inner and outer faces thereof are links 20 respectively. Each pair of links is centrally pivotally connected and is likewise pivotally connected with the outer members of the table legs. Also preferably the pivotal connection between the pairs of links is in the nature of a carriage joint. It will be apparent that swinging the links to one position will cause the outer members of the legs to be spread away from each other so that the inner members 19 thereof may be freely slid between the outer member. Each of the inner members is provided with a stop or abutment member 21 to contact with the pairs of links on the inner surfaces of the outer members of the legs for limiting the outward movement of the inner leg sections, while the inner leg sections 19 on their outer faces are provided with elongated springs 22 to frictionally contact with the inner faces of the outer links, the frictional engagement between these springs and links holding the inner leg sections adjusted with respect to the outer leg sections. The springs 22 may be provided with offset portions 23, and the outer links may contact with the said offset portions and thereby hold the inner or intermediate leg sections adjusted on the outer leg sections.

After the table has been set up, the table linen, utensils and food stuff may be removed from the receptacle 8 and arranged on the table, and the top plate 8 may be again positioned over the open top of the said receptacle so that the receptacle may be employed as a bench or seat. In a like manner, by turning the base 10 of the luggage carrier 11 upwardly, the same can be also employed as a bench, and it is thought that the foregoing description, when taken in connection with the drawings will fully set forth the construction, operation and advantages of the improvement to those skilled in the art to which such inventions relate without further detailed description.

Having described the invention, I claim:—

1. A camper's or picnicker's outfit designed for transportation on the running board of an automobile including a table, comprising a top, side leaves hinged thereto, and swingable and fixed legs on the ends of the top, the swingable leg sections designed to be swung under the leaves for supporting the same when the table is set up, and when swung against the fixed leg sections and the leaves are swung to folded position, designed to provide the ends of a receptacle, the sides of which being provided by the leaves.

2. A camper's or picnicker's outfit designed for transportation on the running board of an automobile including a table susceptible to being converted into a receptacle or into a bench, said table including a top, cleats arranged in opposite pairs at the edges of the top, two of the diagonally opposed cleats being fixed to the top and the other cleats being pivoted thereto, fixed telescopic leg sections at the outer ends of the fixed cleats, telescopic leg sections secured to the outer ends of the swingable cleats, leaves hingedly secured to the edges of the table, said leaves designed to rest upon the swingable cleats when the latter are swung outwardly from the table top, and the flanges of the said leaves designed to frictionally engage with the leg sections adjacent thereto when swung to folded position on the table top, and the legs when arranged at the ends of the top being of a width equal to that of the said top.

3. A camper's or picnicker's outfit designed for transportation on the running board of an automobile, including a table susceptible to being converted into a receptacle or into a bench, said table including a top, cleats arranged in opposite pairs on the edges of the top, two of the diagonally opposed cleats being fixed to the top and the other cleats being pivoted thereto, fixed telescopic leg sections at the outer ends of the fixed cleats, telescopic leg sections secured to the outer ends of the swingable cleats, each of said legs comprising three sections, the central section being telescopically received in the end sections, interengaging means between the sections, breakable means for spreading the end sections to permit of the free sliding of the intermediate sections therebetween, means locking the central sections when adjusted with respect to the end leg sections, leaves hinged to the top and designed to be supported when the pivoted cleats are swung therebeneath and to be swung against the fixed and pivoted cleats and the outer ends of the leg members when the device is set up as a receptacle.

4. In a device for the purpose set forth, a table which is designed to be converted into a receptacle, comprising a top, wings hinged to the edges thereof, a fixed leg at each end of the top, movable legs pivotally supported on the top designed for supporting the wings in a plane with the top when moved to one position and to abut the fixed legs when moved to a second position, and said wings designed to be swung against said legs when in their last mentioned position and when the table is inverted to convert the same into a receptacle, each of said legs comprising outer sections whose confronting faces are grooved and inner sections which have tongues which are received in the grooves, foldable means connected to the outer sections for forcing the same away from each other to permit of the free sliding movement of the inner sections therebetween or for compressing said outer sections toward each other and against the inner sections.

5. In a device for the purpose set forth, a table which is designed to be converted into a receptacle, comprising a top, wings hinged to the edges thereof, a fixed leg at each end of the top, movable legs pivotally supported on the top designed for supporting the wings in a plane with the top when moved to one position and to abut the fixed legs when moved to a second position, and said wings designed to be swung against said legs when in their last mentioned position and when the table is inverted to convert the same into a receptacle, each of said legs comprising outer sections whose confronting faces are grooved and inner sections having tongues that are received in the grooves connected links pivoted to the respective outer leg sections, means on the inner leg sections for contacting the links for limiting the outward movement of the said inner leg sections, and means also on said inner leg sections for frictionally engaging the links for sustaining the said inner sections adjusted with respect to the outer sections.

In testimony whereof I affix my signature.

MELVEL H. MERRIAM.